(12) United States Patent
Lin

(10) Patent No.: US 7,760,399 B2
(45) Date of Patent: Jul. 20, 2010

(54) METHOD AND SYSTEM FOR ENCODING COLOR IMAGES TO BLACK-AND-WHITE BITMAPS AND DECODING COLOR IMAGES

(75) Inventor: Guo-Yau Lin, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 675 days.

(21) Appl. No.: 11/717,939

(22) Filed: Mar. 13, 2007

(65) Prior Publication Data

US 2008/0225342 A1   Sep. 18, 2008

(51) Int. Cl.
H04N 1/405 (2006.01)
(52) U.S. Cl. ...................... 358/3.07; 358/504
(58) Field of Classification Search .................. 358/1.9, 358/2.1, 3.06–3.09, 3.16, 3.2, 504–505, 406, 358/474, 500–501, 515, 517; 382/162–165, 382/237
See application file for complete search history.

(56) References Cited

U.S. PATENT DOCUMENTS

| | | | |
|---|---|---|---|
| 5,848,180 A | 12/1998 | Coleman | 382/162 |
| 5,848,225 A | 12/1998 | Nickell et al. | 395/109 |
| 6,989,839 B2 | 1/2006 | Braun et al. | 345/591 |
| 7,298,927 B2 * | 11/2007 | Nako et al. | 382/298 |
| 2004/0257378 A1 | 12/2004 | Braun et al. | 345/591 |
| 2005/0069197 A1 | 3/2005 | De Queioz et al. | 382/162 |

* cited by examiner

Primary Examiner—Thomas D Lee
Assistant Examiner—Stephen M. Brinich
(74) Attorney, Agent, or Firm—Kermit D. Lopez; Luis M. Ortiz; Ortiz & Lopez, PLLC

(57) ABSTRACT

A method and system for encoding a color image into a monochrome halftoned image for printing, includes the use of a decoding mechanism to recover color information from the monochrome halftone image. A luminance channel associated with the color image can be utilized as the grayscale input to a half-toning process, while chrominance channels are utilized to determine displacements of the halftone dots. The color information can then be restored utilizing a template to measure the displacements of the halftone dots and hence the color information. Thus, the color information can be preserved without visual impact.

20 Claims, 6 Drawing Sheets

METHOD AND SYSTEM FOR ENCODING COLOR IMAGES TO BLACK-AND-WHITE BITMAPS AND DECODING COLOR IMAGES

TECHNICAL FIELD

Embodiments are generally related to data-processing methods and systems. Embodiments are also related to image processing methods and systems. Embodiments are additionally related to the encoding of color images.

BACKGROUND OF THE INVENTION

When a color image is copied, printed or faxed on a black-and-white rendering device, the colors are converted to shades of gray. Two different colors with the same luminance or perceived brightness may "map" to the same shade of gray, making it impossible to interpret the information that the colors carry. When such a situation occurs on graphics such as pie charts or bar charts, two colors will appear the same and the chart loses its information value.

When converting color images to black and white bitmaps for printing or storing, the color information is usually lost and cannot be recovered. Some methods address this issue, and encode the color information into the black and white image by using some form of visible textures. The visible textures, however, may sometimes appear uneven and difficult to discern. Such textures also strongly imply that the areas with different textures should be treated differently, even when one does not intend to differentiate between them.

While trying to determine how to retain the information conveyed in color images, researchers have searched for new techniques to represent color images in black and white. Some methods transform each color into a microscopically different texture or pattern in the gray portions of an image. By implementing such a method, it is relatively easy to identify colors with similar luminance value, thereby making the pictures more pleasing and useful. Thus, by mapping the color to textures in this manner, the textures can be later decoded and converted back to color.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved image-processing system and method.

It is another aspect of the present invention to provide for an improved method and system for encoding the color images into bitmaps for rendering.

It is a further aspect of the present invention to provide for an improved method and system for encoding color images to black-and-white bitmaps and decoding color images.

The aforementioned aspects and other objectives and advantages can now be achieved as described herein. A method and system for encoding color images into bitmaps or halftone images for rendering is disclosed, including the use of a decoding mechanism for processing bitmaps and recovering color information. A scrambled mapping can be utilized as a password for decoding. The encoding process converts input images to an L*a*b* color space, and utilizes a* and b* information to determine the displacement of the centroid of the halftone dot based on an optional scrambled mapping, while the L* channel is used as a grayscale input to the half-toning process.

The decoding process first estimates local grayscale information and then based on the estimated grayscale, searches for the best matched pattern among the halftone dot patterns with different displacements to recover the a* and b* information. The final reconstructed color image is then converted from the recovered L*, a*, and b* information. Although the L*a*b* color is used here, any color space that extracts luminance/lightness information can be utilized in the encoding/decoding path. Such encoding/decoding scheme can be used in fax printing/recovering and color to black and white rendering/recovering. The advantage of these techniques is that the color information is preserved without visual impact.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
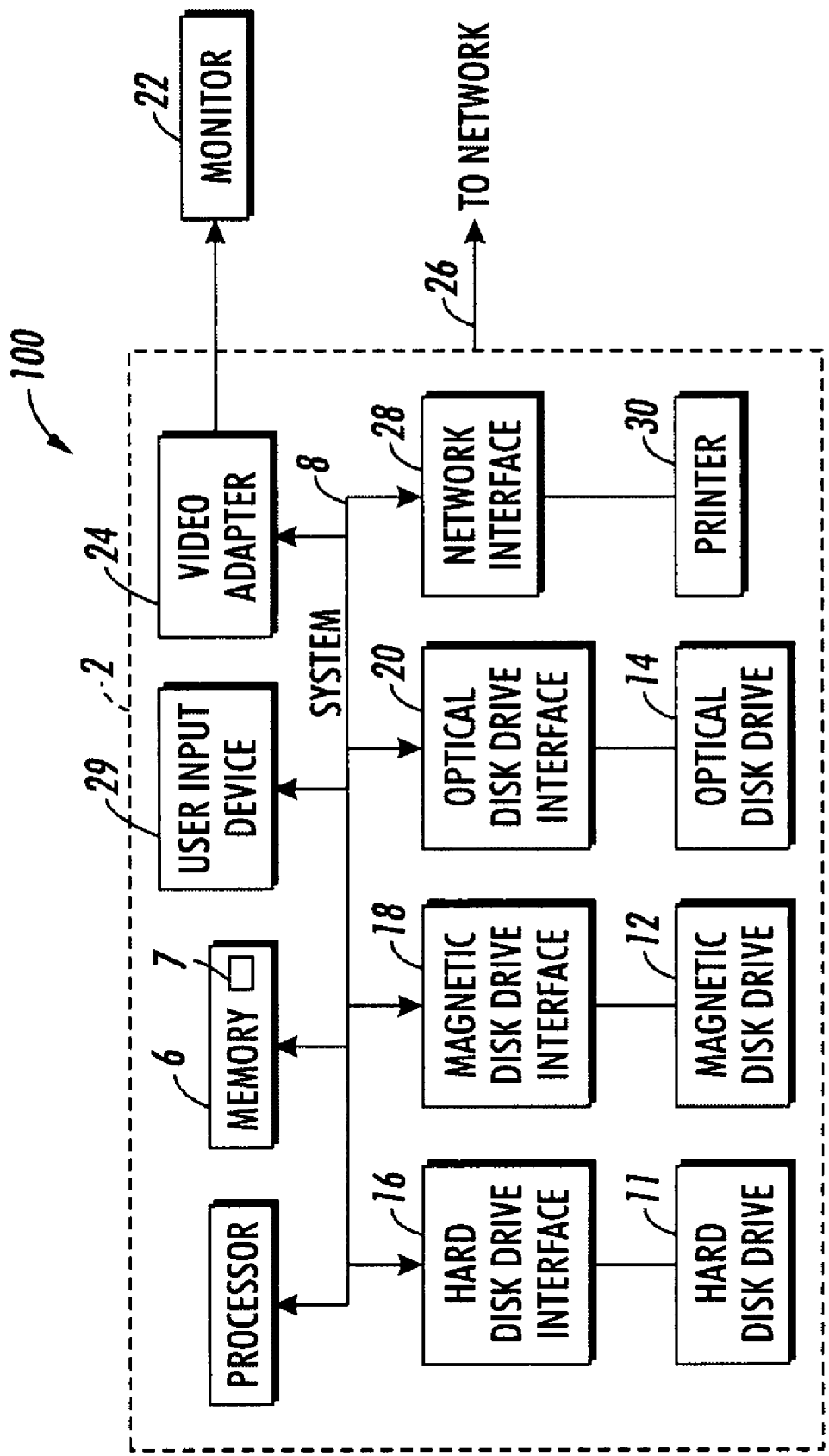
FIG. 1 illustrates a block diagram of a data-processing apparatus that can be adapted for use in encoding color images to black-and-white bitmaps and decoding color image, in accordance with a preferred embodiment.

FIG. 1 illustrates a block diagram of a data-processing apparatus 100 that can be adapted for use in encoding color images to black-and-white bitmaps and decoding a color image, in accordance with a preferred embodiment. Data-processing apparatus 100 can be configured to include a general purpose computing device, such as a computer 2. It can be appreciated that the data-processing apparatus depicted in FIG. 1 is an example of but one of many possible types of data-processing and computing devices that can be adapted for use in accordance with varying embodiments of the present invention. Thus, data-processing apparatus 100 does not constitute a limiting feature of the present invention but is discussed here for general illustrative purposes only.

The computer 2 includes a processing unit 4, a memory 6, and a system bus 8 that operatively couples the various system components to the processing unit 4. One or more processing units 4 can operate as either a single central processing unit (CPU) or a parallel processing environment. Data-processing apparatus 100 represents only one of many possible image-processing devices or systems for implementing embodiments. Data-processing apparatus 100 can be provided as a stand-alone personal computer, portable/laptop computer, PDA (personal digital assistant), server, mainframe computer, and so forth.

The data-processing apparatus 100 generally includes one or more data storage devices for storing and reading program and other data. Examples of such data storage devices include a hard disk drive 11 for reading from and writing to a hard disk (not shown), a magnetic disk drive 12 for reading from or writing to a removable magnetic disk (not shown), and an optical disc drive 14 for reading from or writing to a removable optical disc (not shown), such as a CD-ROM or other optical medium. A monitor 22 is connected to the system bus 8 through an adapter 24 or other interface. Additionally, the data-processing apparatus 100 can include other peripheral output devices (not shown), such as speakers and printers. For example, a user input device 29, such as a mouse, keyboard, and so forth, can be connected to system bus 8 in order to permit a user to enter data to and interact with data-processing apparatus 100.

The hard disk drive 11, magnetic disk drive 12, and optical disc drive 14 are connected to the system bus 8 by a hard disk drive interface 16, a magnetic disk drive interface 18, and an optical disc drive interface 20, respectively. These drives and their associated computer-readable media provide nonvolatile storage of computer-readable instructions, data structures, program modules, and other data for use by the data-processing apparatus 100. Note that such computer-readable instructions, data structures, program modules, and other data can be implemented as a module or group of modules, such as, for example, module 7, which can be stored within memory 6.

Note that the embodiments disclosed herein can be implemented in the context of a host operating system and one or more module(s) 7. In the computer programming arts, a software module can be typically implemented as a collection of routines and/or data structures that perform particular tasks or implement a particular abstract data type.

Software modules generally comprise instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus such as data-processing apparatus 100, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Any type of computer-readable media that can store data that is accessible by a computer, such as magnetic cassettes, flash memory cards, digital versatile discs (DVDs), Bernoulli cartridges, random access memories (RAMs), and read only memories (ROMs) can be used in connection with the embodiments.

A number of program modules can be stored or encoded in a machine readable medium such as the hard disk drive 11, the, magnetic disk drive 12, the optical disc drive 14, ROM, RAM, etc or an electrical signal such as an electronic data stream received through a communications channel. These program modules can include an operating system, one or more application programs, other program modules, and program data.

The data-processing apparatus 100 can operate in a networked environment using logical connections to one or more remote computers (not shown). These logical connections are implemented using a communication device coupled to or integral with the data-processing apparatus 100. The image sequence to be analyzed can reside on a remote computer in the networked environment. The remote computer can be another computer, a server, a router, a network PC, a client, or a peer device or other common network node. FIG. 1 depicts the logical connection as a network connection 26 interfacing with the data-processing apparatus 100 through a network interface 28. Such networking environments are commonplace in office networks, enterprise-wide computer networks, intranets, and the Internet, which are all types of networks. It will be appreciated by those skilled in the art that the network connections shown are provided by way of example and that other means of and communications devices for establishing a communications link between the computers can be used.

Figure 2:
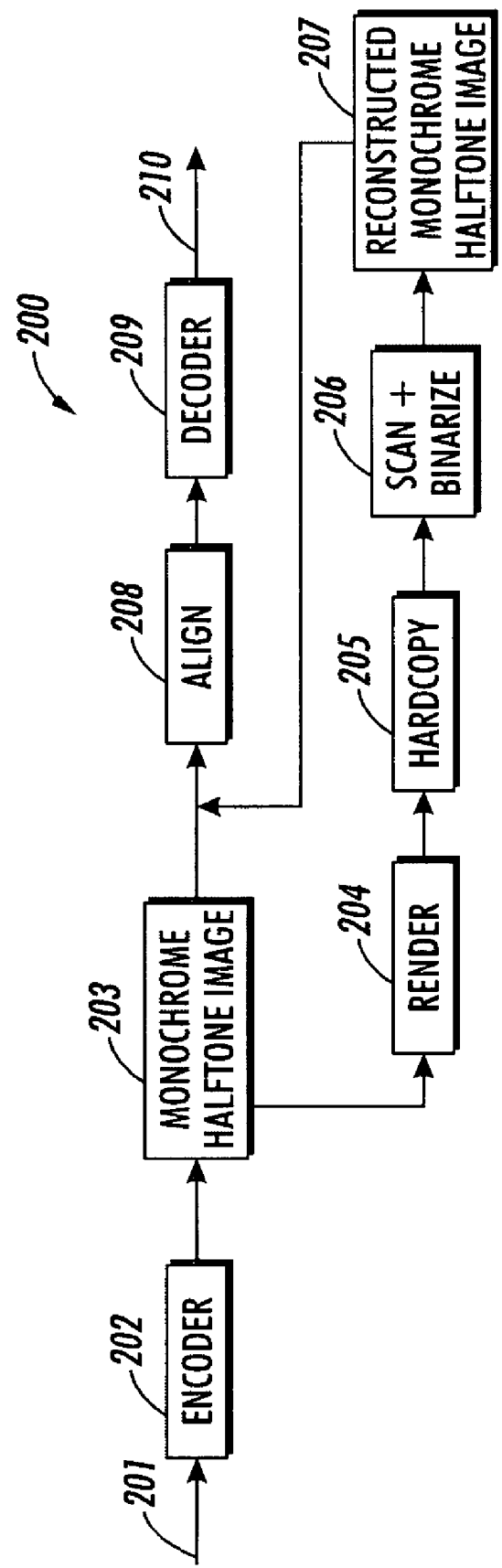
FIG. 2 illustrates a block diagram of a system for encoding color images to black and white bitmaps and decoding back to color, in accordance with a preferred embodiment

Referring to FIG. 2, a diagram of a system 200 for encoding color images to black and white bitmaps and decoding back to color is illustrated, in accordance with a preferred embodiment. The system 200 can be implemented by a module such as module 7 depicted in FIG. 1 or may utilize one or more such software modules in association with a data-processing apparatus, such as, for example, the data-processing apparatus 100 depicted in FIG. 1. Each block such as blocks 202, 203, 208, 209, 205, 206, 207 and so forth can represent a module such as module 7 depicted in FIG. 1.

As indicated in FIG. 2, an arrow 201 represents the input of a color image to an encoder 202. Following processing by the encoder 201, the color image can be encoded utilizing a monochrome halftone encoder 203. Thereafter, the monochrome halftone image can be output from the halftone encoder and then rendering utilizing a rendering device 204 (e.g., a printer) or stored in an electronic form and then compressed, distributed, transmitted, and/or faxed for black and white applications via various modules, such as, for example, a module 205 for rendering a hardcopy, a module 206 for scanning and binarization, and a module 207 for generating a reconstructed monochrome halftone image.

To recover the color information, the process can be repeated from the monochrome halftone imaging operation provided by monochrome halftone image encoder 203 or from a hardcopy operation generated by the rendering device 204 and module 205. The black and white hardcopy generated as a result of the operations performed by the rendering device 204 and the module 205 can be subject to a process of scanning and binarization carried out by the scanning and binarization module 206 with a fixed threshold to create the reconstructed halftone image via the module 207. The stored original monochrome halftone image as indicated at block 203 or the reconstructed monochrome halftone image at depicted at block 207 can be then subjected to an alignment via an aligning module 208 to identify the location of non-shifted dots. The alignment operation performed by the alignment module 208 involves the process of removing rotation, translation, and magnification and can be accomplished with the assistance of registration marks or a similar medium.

To simplify the embodiment, however, possible printer and scanner defects and imperfections can be ignored in the print/scan path. After alignment by the alignment module 208, the monochrome halftone image as depicted at block 203, can be then decoded utilizing a decoder 209 to recover the color information and combine with the estimated grayscale information, and thereby generate a reconstructed color image which is represented in FIG. 2 by an output arrow 210. It can be clearly seen that the compression ratio (color to B/W) is 24:1, while the color information is embedded.

Figure 3:
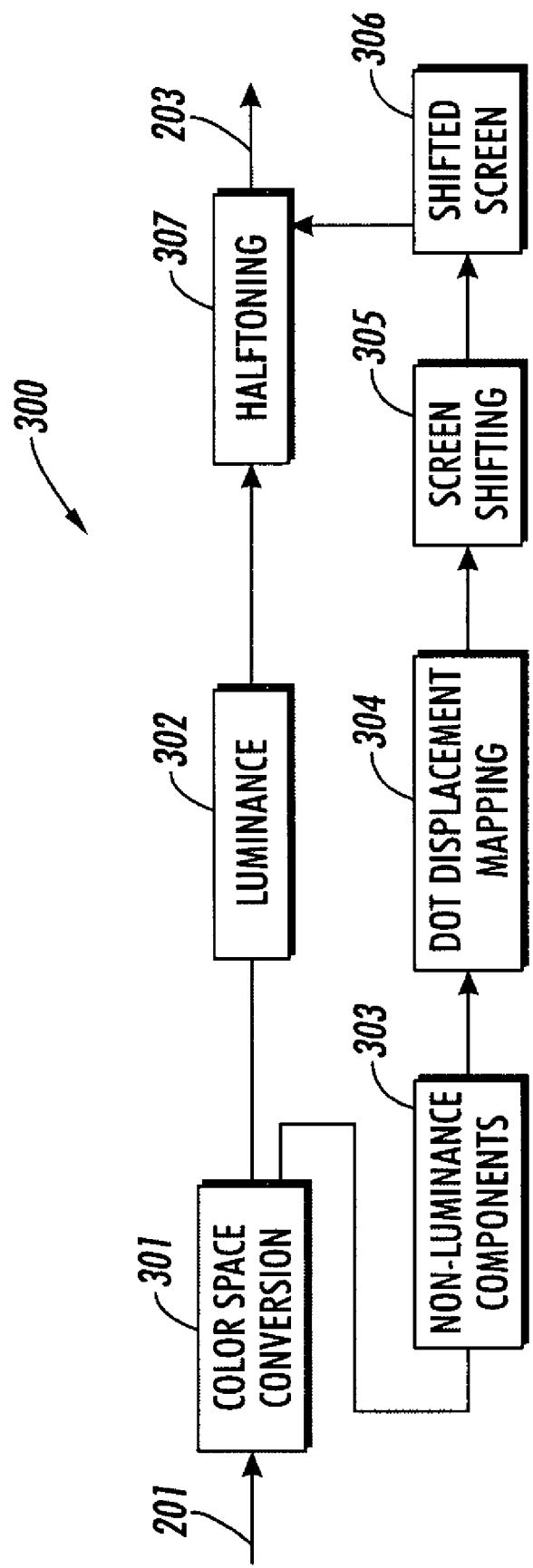
FIG. 3 illustrates a diagram of system for encoding color images to black-and-white bitmaps, in accordance with an alternative embodiment.

FIG. 3 illustrates a diagram of system 300 for encoding color images to black-and-white bitmaps, in accordance with an alternative embodiment. The system 300 can be implemented by a module such as module 7 depicted in FIG. 1 or may utilize one or more such software modules in association with a data-processing apparatus, such as, for example, the data-processing apparatus 100 depicted in FIG. 1.

A color image as represented in FIG. 3 by arrow 201 can be first converted to a designated intermediate color space utilizing a color space converter block 301. The color space converter 301 extracts the luminance or "lightness" information via an extraction module 302, which is a key element for converting color to black and white from a chroma or other information. The extracted luminance module 302 generates data, which is input to a half-toning module 307. The non-luminance components 303 output from the color space converter or conversion module 301 undergo dot displacement mapping via a dot displacement mapping module 304 and are then subjected to a screen shifting operation provided by a screen shifting module 305. Each pixel (not shown in FIG. 3) is then subjected to a half-toning process provided by a half-toning module 307 with a shifted screen 306 to generate the monochrome halftone image as indicated by arrow 203. The monochrome halftone image represented by arrow 203 in FIG. 2 when generated by system 200 is texture-free, even when the color information is embedded in the image. Note that in FIGS. 2 and 3, identical or similar parts and/or elements are generally indicated by identical reference numerals. Thus, reference numerals 201 and 203 as depicted in FIG. 2 and reference numerals 201 and 203 depicted in FIG. 3 refer to the same component in FIG. 3.

Figure 4:
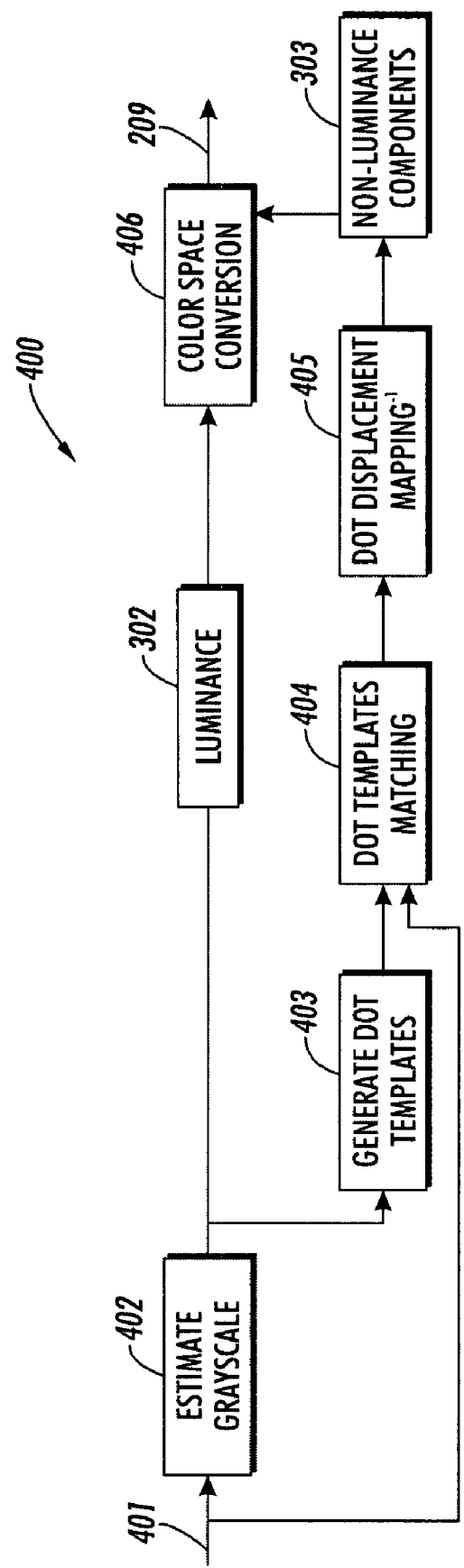
FIG. 4 illustrates a block diagram of a system for decoding a black and white image to a color image, in accordance with a preferred embodiment.

FIG. 4 illustrates a block diagram of a system 400 for decoding of a black and white image to a color image in accordance with an alternative embodiment. In system 400, the input to the decoder 209 can be aligned with a bitmap 401. For each pixel, a first estimate grayscale can be generated utilizing a grayscale module 402 and based on a particular window or set of data. Estimated grayscale data generated by module 402 can be then utilized as an input to an entire set of shifted screens. A set of dot templates with different centroid locations can be generated by a module 403. Each dot template is associated with a horizontal and a vertical displacement. The dot pattern around the processes pixel for the input aligned bitmap represented by arrow 401 can be utilized as a target for dot templates to match. A dot matching template module can then be processed to find the dot matching templates. The displacements associated with this dot template can be added to an inverse mapping module 405 to reconstruct the non-luminance components via a reconstruction module 303. Finally, the estimated grayscale data generated by module 402 can be combined with the reconstructed non-luminance components generated by module 303 for each pixel and subject to a color space conversion module 406 to form the reconstructed color image 210 in the color L*a*b* space. The entire process can be repeated until all pixels are processed. The reconstructed color image 210 in the L*a*b can be then converted to the destination color space.

Figure 5:
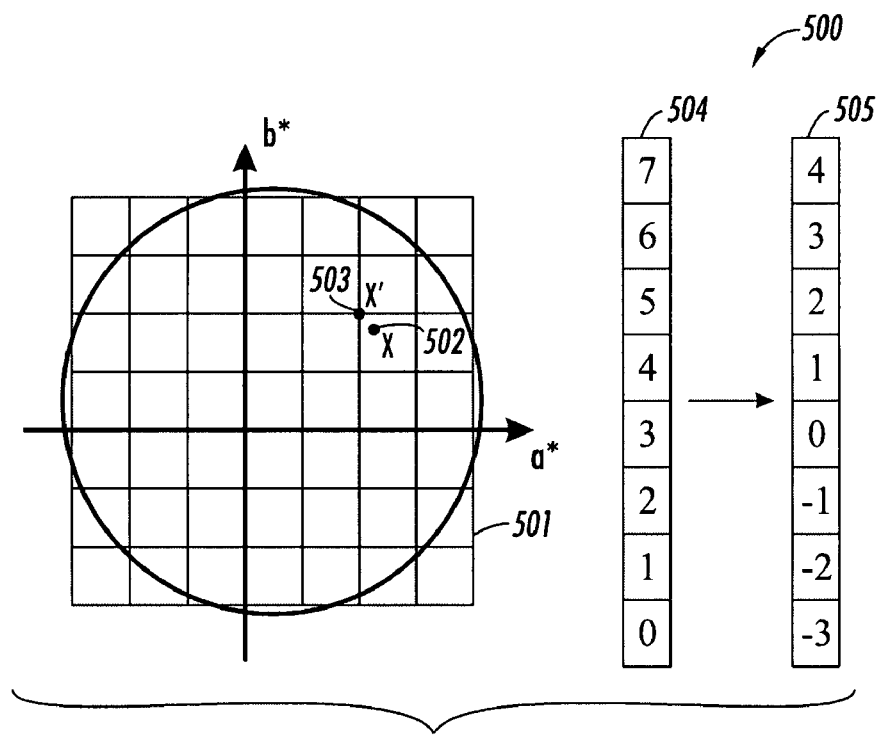
FIG. 5 illustrates an example of a dot displacement mapping method for encoding color images to black-and-white bitmaps and decoding color images, in accordance with an alternative embodiment.

FIG. 5 illustrates an example of a dot displacement mapping method 500 for encoding color images to black-and-white bitmaps and decoding color images, in accordance with an alternative embodiment. In the depicted in FIG. 5, a single 8×8 cluster dot screen 501 can be utilized. As a result, the L* is equivalently quantized to 65 different levels. Then a* and b* are quantized individually to 8 output levels. The offset amounts in the horizontal and vertical directions vary based on the a* and b* values. Variables X and X' represent the input sample 502 and quantized output 503. Each out from a quantization output index 504 can be then mapped to the dot offset 505 in pixels. The quantization output index 504 level and the dot offset 505 permit the screen to possess a 1-to-1 mapping relationship. Finally, each pixel can be halftoned with the screen that is already shifted based on the a* and b* values of that pixel.

Figure 6:
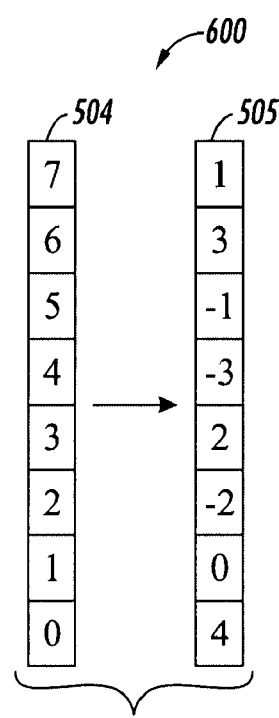
FIG. 6 illustrates an example of scrambled dot displacement mapping involved in the encoding process of a color image for encoding color images to black-and-white bitmaps and decoding color images, in accordance with an alternative embodiment.

FIG. 6 illustrates an example of scrambled dot displacement mapping 600 involved in the encoding process of a color image 201 for encoding color images to black-and-white bitmaps and decoding color images, in accordance with an alternative embodiment. To encode the color information for security or other purpose, the quantization of the output index 504 to dot offset 505 mapping can be scrambled. The resulting scrambled dot displacement mapping 600 can be utilized as a password to correctly decode the color information. Note that in FIGS. 5 and 6, identical or similar parts and/or elements are generally indicated by identical reference numerals. Thus, reference numerals 504 and 505 as depicted in FIG. 5 and reference numerals 504 and 505 depicted in FIG. 6 refer to the same components in FIG. 6.

Figure 7:
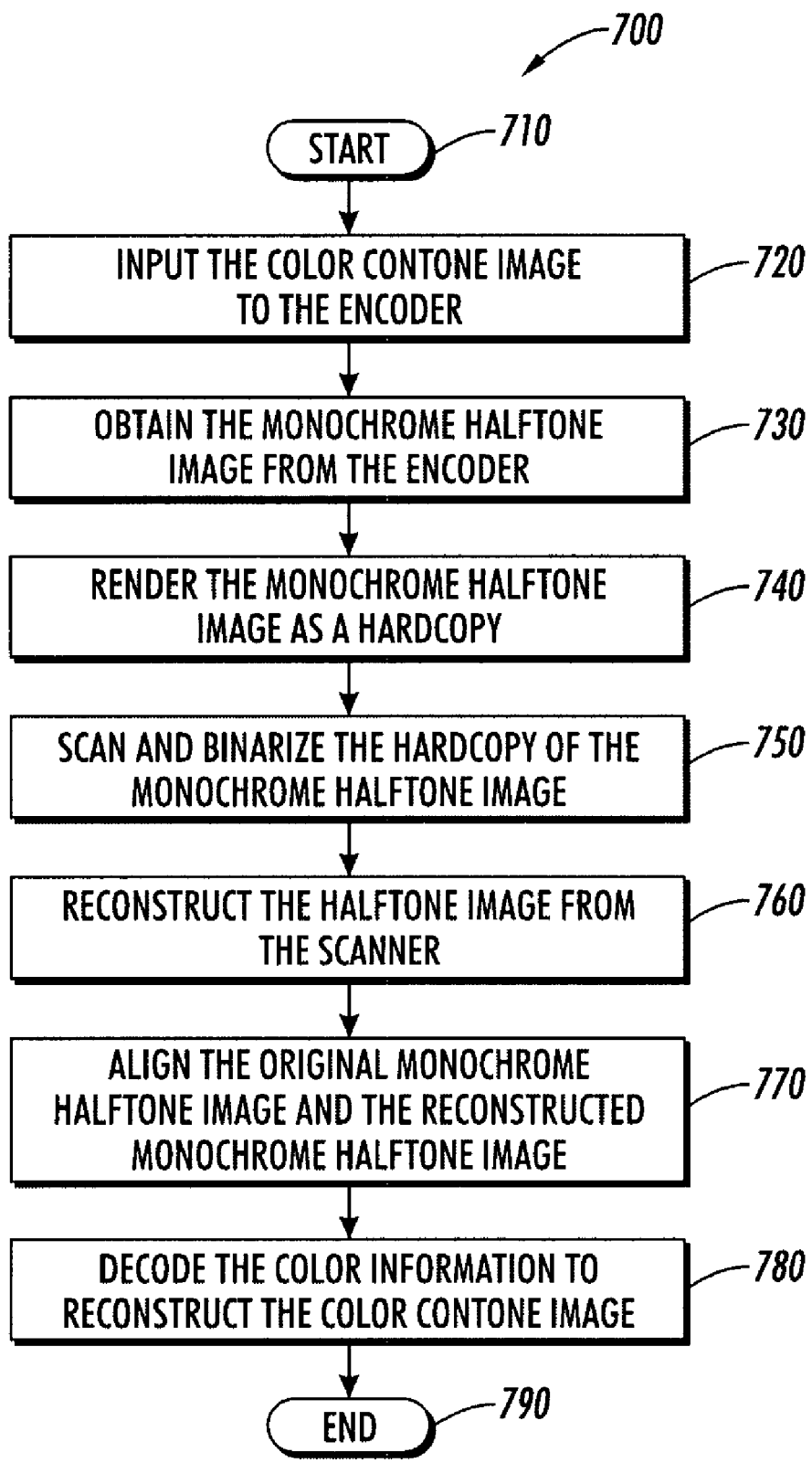
FIG. 7 illustrates a high level flow chart of operations depicting logical operational of a method for encoding a color image to black-and-white bitmaps and decoding color image, in accordance with the preferred embodiment.

FIG. 7 illustrates a high-level flow chart of operations depicting logical operation steps of a method 700 for encoding a color image to black-and-white bitmaps and decoding a color image, in accordance with an alternative embodiment. As depicted at block 710, the process can begin. Next, as indicated at block 720, a color contone image can be input to an encoder such as, for example, the encoder 202 depicted in FIG. 2. Thereafter, as described at block 730, a monochrome halftone image can be obtained from the encoder. Next, as depicted at block 740, the monochrome halftone image can be rendered (e.g., printed) as a hardcopy. Thereafter, as illustrated at block 750, the hardcopy of the monochrome halftone image can be scanned and binarized via a scanning device. Next, as depicted at block 760, the halftone image can be reconstructed from the scanning device. Thereafter, as indicated at block 770, the original monochrome halftone image and the reconstructed monochrome halftone image can be aligned. Next, as illustrated at block 780, the color information can be decoded to reconstruct the color contone image. The process can then terminate, as indicated at block 790.

Based on the foregoing it can be appreciated that for a given input color image, a halftone image can be generated by the encoder described herein. The reconstructed image can then be generated by the described decoder. It is evident from the halftone image that the encoded color information can hardly be detected by the human eyes. If the print/scan path is used in the workflow, the scan resolution should be at least the same or greater than the print resolution.

The embodiments described herein serve to preserve the cue of the color very well, considering the amount of information that may have been dropped. The performance with respect to the details may have some limitations, since a grayscale estimator is essentially embedded in the system. Therefore, some segmentation or mask process is preferred for processing the multi-content documents. Dot displacement mapping can be further optimized to better preserve neutral colors. An enhanced quantizer can be designed so that there is always one output index corresponding to a neutral axis, meaning a*=b*=0, for a given L*. A vector or non-evenly spaced quantizer for each given L* can also be utilized for enhanced color encoding/decoding.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for encoding color images to black and white bitmaps and decoding back to color, comprising:
    encoding a color image by producing a monochrome halftone image based on said color image;
    rendering said monochrome halftone image as a hardcopy; and
    reconstructing and aligning said monochrome halftone image in order to produce an aligned halftone image for use in reconstructing and rendering said color image.

2. The method of claim 1 wherein encoding said color image comprises:
    converting said color image to an intermediate color space;
    extracting a luminance from said intermediate color space and identifying screen-shifted non-luminance components thereof; and
    half-toning said luminance and screen-shifted non-luminance components.

3. The method of claim 2 further comprising:
    subjecting said screen-shifted non-luminance components to a dot displacement mapping wherein dot displacements thereof are screen shifted.

4. The method of claim 1 further comprising decoding said color image by:
    estimating said aligned halftone image utilizing grayscale data;
    extracting said luminance from said aligned halftone image based on said grayscale data;
    reconstructing non-luminance components from said aligned halftone image; and
    thereafter reconstructing said color image in response to reconstructing said non-luminance components, extracting said luminance, and estimated said aligned halftone image.

5. The method of claim 4 wherein reconstructing said non-luminance components comprises:
    generating a plurality of dot templates;
    analyzing said plurality of dot templates for dot template matching; and
    performing an inverse dot displacement mapping with respect to said plurality of dot templates in order to assist in reconstructing said non-luminance components.

6. The method of claim 5 further comprising optimizing said dot displacement mapping in order to preserve neutral colors thereof.

7. The method of claim 1 further comprising scanning and binarizing said hardcopy in response to rendering said monochrome halftone image as a hardcopy.

8. A system for encoding color images to black and white bitmaps and decoding back to color, comprising:
    a data-processing apparatus;
    at least one module executed by said data-processing apparatus, said at least one module and said data-processing apparatus being operable in combination with one another to:
        encoding a color image by producing a monochrome halftone image based on said color image;
        rendering said monochrome halftone image as a hardcopy;
        storing said monochrome halftone image for later use;
        transferring said monochrome halftone image through at least one narrow-bandwidth channel; and
        reconstructing and aligning said monochrome halftone image in order to produce an aligned halftone image for use in reconstructing and rendering said color image.

9. The system of claim 8 wherein said data-processing apparatus and said at least one module are further operable in combination with one another to encode said color image by:
    converting said color image to an intermediate color space;
    extracting a luminance from said intermediate color space and identifying screen-shifted non-luminance components thereof; and
    half-toning said luminance and screen-shifted non-luminance components.

10. The system of claim 9 wherein said data-processing apparatus and said at least one module are further operable in combination with one another to subject said screen-shifted non-luminance components to a dot displacement mapping wherein dot displacements thereof are screen shifted.

11. The system of claim 8 wherein said data-processing apparatus and said at least one module are further operable in combination with one another to decode said color image by:
    estimating said aligned halftone image utilizing grayscale data;
    extracting said luminance from said aligned halftone image based on said grayscale data;
    reconstructing non-luminance components from said aligned halftone image; and
    thereafter reconstructing said color image in response to reconstructing said non-luminance components, extracting said luminance, and estimated said aligned halftone image.

12. The system of claim 11 wherein said data-processing apparatus and said at least one module are further operable in combination with one another to reconstruct said non-luminance components by:
    generating a plurality of dot templates;
    analyzing said plurality of dot templates for dot template matching; and
    performing an inverse dot displacement mapping with respect to said plurality of dot templates in order to assist in reconstructing said non-luminance components.

13. The system of claim 11 wherein said data-processing apparatus and said at least one module are further operable in combination with one another to optimize said dot displacement mapping in order to preserve neutral colors thereof.

14. The system of claim 8 further wherein said data-processing apparatus and said at least one module are further operable in combination with one another to scan and binarize said hardcopy in response to rendering said monochrome halftone image as a hardcopy.

15. A program product residing in a computer for encoding color images to black and white bitmaps and decoding back to color, comprising:
- instruction media residing in a computer for encoding a color image by producing a monochrome halftone image based on said color image;
- instruction media residing in a computer for rendering said monochrome halftone image as a hardcopy; and
- instruction media residing in a computer for reconstructing and aligning said monochrome halftone image in order to produce an aligned halftone image for use in reconstructing and rendering said color image.

16. The program product of claim 15 wherein said instruction media residing in a computer for encoding said color image further comprises:
- instruction media residing in a computer for converting said color image to an intermediate color space;
- instruction media residing in a computer for extracting a luminance from said intermediate color space and identifying screen-shifted non-luminance components thereof; and
- instruction media residing in a computer for half-toning said luminance and screen-shifted non-luminance components.

17. The program product of claim 16 further comprising:
- instruction media residing in a computer for subjecting said screen-shifted non-luminance components to a dot displacement mapping wherein dot displacements thereof are screen shifted.

18. The program product of claim 15 further comprising instruction media residing in a computer for decoding said color image, wherein said instruction media further comprises:
- instruction media residing in a computer for estimating said aligned halftone image utilizing grayscale data;
- instruction media residing in a computer for extracting said luminance from said aligned halftone image based on said grayscale data;
- instruction media residing in a computer for reconstructing non-luminance components from said aligned halftone image; and
- instruction media residing in a computer for thereafter reconstructing said color image in response to reconstructing said non-luminance components, extracting said luminance, and estimated said aligned halftone image.

19. The program product of claim 18 wherein said instruction media residing in a computer for reconstructing said non-luminance components further comprises:
- instruction media residing in a computer for generating a plurality of dot templates;
- instruction media residing in a computer for analyzing said plurality of dot templates for dot template matching; and
- instruction media residing in a computer for performing an inverse dot displacement mapping with respect to said plurality of dot templates in order to assist in reconstructing said non-luminance components.

20. The program product of claim 15 further comprising instruction media residing in a computer for scanning and binarizing said hardcopy in response to rendering said monochrome halftone image as a hardcopy.

* * * * *